United States Patent [19]

Bowers

[11] Patent Number: 4,714,008

[45] Date of Patent: Dec. 22, 1987

[54] PISTON FOR INTERNAL COMBUSTION ENGINES AND THE LIKE

[76] Inventor: Walter B. Bowers, 6046 N. Remington St., Fresno, Calif. 93704

[21] Appl. No.: 800,448

[22] Filed: Nov. 21, 1985

[51] Int. Cl.⁴ .................................................. F16J 1/04
[52] U.S. Cl. ........................................ 92/219; 92/221; 92/255; 92/258
[58] Field of Search ................. 92/255, 258, 216, 219, 92/220, 221; 123/193 P

[56] References Cited

U.S. PATENT DOCUMENTS

| | | | |
|---|---|---|---|
| 1,460,535 | 7/1923 | Davies | 92/221 X |
| 2,069,437 | 2/1937 | Frank | 92/221 X |
| 2,208,898 | 7/1940 | Eichelberger | 92/221 X |
| 2,328,439 | 8/1943 | Esnault-Pelterie . | |
| 2,615,769 | 10/1952 | Barnes et al. . | |
| 3,007,723 | 11/1961 | Clarke . | |
| 3,136,306 | 6/1964 | Kamm | 92/255 X |
| 3,327,593 | 6/1967 | Ciaccia . | |
| 3,398,653 | 8/1968 | Foster . | |
| 3,466,054 | 9/1969 | Berg . | |
| 4,268,042 | 5/1981 | Borlan . | |
| 4,485,728 | 12/1984 | Bando . | |

FOREIGN PATENT DOCUMENTS

| | | | |
|---|---|---|---|
| 80361 | 4/1951 | Czechoslovakia | 92/219 |
| 2475672 | 8/1981 | France | 92/255 |
| 195109 | 3/1923 | United Kingdom . | |
| 356599 | 9/1931 | United Kingdom | 92/221 |

Primary Examiner—Edward K. Look
Attorney, Agent, or Firm—Worrel & Worrel

[57] ABSTRACT

An improved piston for operation within a cylinder. The piston includes a main piston body having a primary cylindrical surface, a first end, and a secondary surface of smaller diameter, the secondary surface of smaller diameter is disposed between the primary cylindrical surface and the first end. At least one piston ring is disposed and captured in an operational position about the secondary surface of the piston body by a releasably mounted cap positioned on the first end of the piston body.

8 Claims, 3 Drawing Figures

PISTON FOR INTERNAL COMBUSTION ENGINES AND THE LIKE

BACKGROUND OF THE INVENTION

1. Field of the Invention:

The present invention relates to a piston for internal combustion engines and the like and more particularly to a piston which incorporates operative portions which automatically adjust to deviation in piston movement within its cylinder substantially to eliminate scoring and other damage to the cylinder wall caused by such deviant movement of the piston within the cylinder and which facilitates the replacement of worn or damaged piston rings borne by the piston.

2. Description of the Prior Art:

It has long been known that the efficient operation of devices, such as internal combustion engines and pumps of various types, requires that the piston of the subject device seal effectively against the walls of its associated cylinder to permit effective compression to take place in the device. Sealing of the piston against the associated cylinder wall is accomplished through the use of piston rings that are deployed at various positions along the piston body. Conventional pistons used in internal combustion engines employ piston rings which are deployed in fixed relation about the piston body in recesses formed in the piston body. While this method of sealing the piston against the associated cylinder wall has long been employed, it has significant shortcomings.

For example, engineers and engine mechanics have long known that the damage to cylinder walls is caused, in part, by deterioration over time of the piston rings borne by the piston. Manifestations of piston ring deterioration, of course, include decreased engine efficiency and loss of power. These manifestations are a direct result of a loss of adequate compression due to inadequate sealing of the piston against the cylinder wall.

While some scoring or other damage to the internal surface of the cylinder wall can occur prior thereto as will hereinafter be discussed, as the piston rings deteriorate the damage to the cylinder wall increases at a progressive rate. The mechanism of this damage has been determined to lie in the fact that when the piston rings become sufficiently worn due to the action of friction upon them, the piston rings permit the piston to deviate somewhat from its axial path of reciprocal movement in the cylinder. As the piston deviates from its axial path of movement, the rings, which are captured in a conventional configuration, are deformed somewhat and the edges thereof are diverted from their facing engagement with the cylinder wall. Contact of the edge of the piston ring with the cylinder wall causes scoring of the cylinder wall. If such a condition is allowed to go unremedied for a substantial period of time, significant damage to the cylinder results. The repair of such damage to the cylinder often requires that the cylinder be rebored or a sleeve inserted to provide a new internal surface.

Furthermore, the replacement of worn piston rings, whether before or after damage to the cylinder wall, is a rather complex and laborious process with conventional pistons. It requires removal of the piston from the engine by disconnecting the piston rod, replacement of the worn piston rings and subsequent remounting of the piston, bearing the new piston rings, in the engine. The remounting operation alone is difficult in that it must be accomplished with great care in order to avoid damage to the cylinder wall.

Damage to the piston rings and to the cylinder wall is not due in total part to deterioration of the piston rings themselves. Those skilled in the art have long known that when a piston travels in a cylinder through top and bottom center, there is created, what is known in the art as "lateral thrust pressure". Lateral thrust pressure, in a conventionally designed piston, acts on the piston to cause it to deviate in slight lateral movement from its intended axial path. It has been determined that the lateral thrust pressure is exerted most strongly in the area of the piston occupied by the piston ring that is nearest the combustion surface end of the piston body. Such lateral thrust pressure which causes the deviant movement of the piston body is the force which moves the piston rings from facing engagement with the cylinder wall, thus permitting the piston rings to score the walls of the cylinder. Deterioration of the cylinder walls is also caused, in some respects, by the fact that the area of the cylinder wall adjacent to the piston rings nearest the combustion surface end of the piston body is an area of the cylinder wall which is generally not as well lubricated as other areas. Furthermore, lateral thrust pressure may cause damaging contact by other portions of the piston body with the cylinder wall.

Therefore, it has long been known that it would be desirable to have a piston which would operate in such a manner as to prevent the scoring and other damage to its associated cylinder wall which has heretofore been the result of worn piston rings and lateral thrust pressure, and furthermore to have a piston which could be serviced and maintained without requiring the removal of the piston and rod assembly from the engine.

OBJECTS AND SUMMARY OF THE INVENTION

Accordingly, it is an object of the present invention to provide an improved piston for internal combustion engines and the like.

Another object is to provide such a piston which is more durable than pistons that have been employed in the past.

Another object is to provide such a piston which permits the ring assembly thereof to remain in substantially facing engagement with the cylinder wall during reciprocation of the piston within the cylinder although the piston body is being subjected to lateral thrust pressure urging the piston to deviate somewhat from its substantially axial path of movement.

Another object is to provide such a piston which is capable of effecting the transfer of lateral thrust pressure exerted on the piston substantially equally and simultaneously over the entire ring assembly and upper portion of the piston body.

Another object is to provide a piston which incorporates a ring assembly about the piston body in such a manner as to absorb deviant motion without damage to the ring assembly or scoring of the cylinder wall.

Another object is to provide such a piston adapted for use in virtually any type of cylinder including that of an internal combustion engine, pump or the like and which has a structure permitting access to the piston rings for repair or replacement without disconnection of the piston rod and removal of the piston from the cylinder.

Further objects and advantages are to provide improved elements and arrangements thereof in an apparatus for the purposes described which is dependable, economical, durable and fully effective in accomplishing its intended purposes.

Additional objects and advantages of the invention will be set forth in part in the description which follows and in part will be apparent from the description or may be learned by practice of the invention. The objects and advantages of the invention may be realized and obtained by means of the instrumentalities of combinations particularly pointed out in the appended claims.

BRIEF DESCRIPTION OF THE DRAWINGS

The accompanying drawings which are incorporated in and constitute a part of the specification illustrate a preferred embodiment of the invention and together with the general description of the invention given above and in the detailed description of the preferred embodiment given below serve to explain the principles of the invention.

DESCRIPTION OF THE PREFERRED EMBODIMENT

Figure 1:
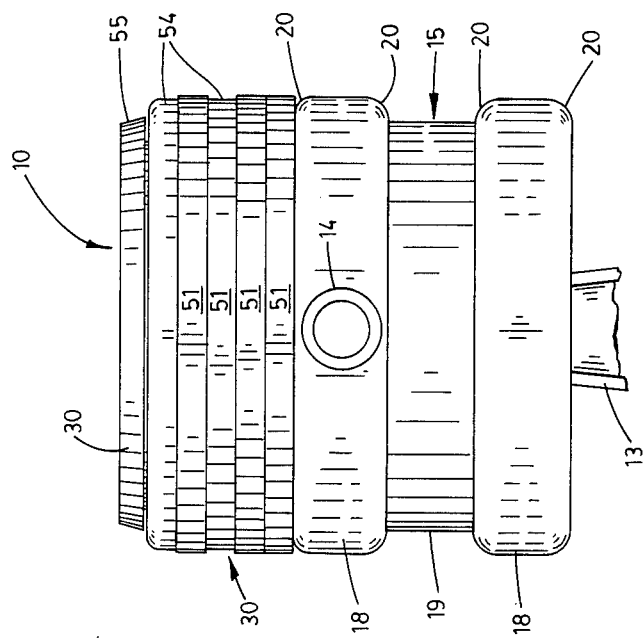
FIG. 1 is a side elevation of the piston for internal combustion engines and the like embodying the principles of the present invention with the piston connected to a piston rod shown fragmentarily.

Referring more particularly to the drawings, the piston for internal combustion engines and the like embodying the principles of the present invention is designated generally by numeral 10 in FIG. 1. As shown therein, the piston has a piston body 11. The piston body moves within the confines of a cylinder, the inwardly disposed cylinder wall being depicted in FIG. 3 and indicated by the numeral 12. A piston rod 13 is connected to the piston body by a pin 14 extending through the piston body and about which the piston rod pivots, as can best be visualized in FIG. 3. The movement of the piston within the cylinder and the interoperation of the piston and piston rod is substantially as, in conventional internal combustion engines except as will hereafter be described.

The piston body has a primary cylindrical surface 15 of a diameter substantially conforming to the interior diameter of the cylinder. The exterior diameter of the piston body and the interior diameter of the cylinder wall have a slight space therebetween to provide slight clearance about the piston body which is exaggerated for illustrative convenience in FIG. 3. This clearance is present in conventional pistons as well as in the piston of the present invention. The piston body has a substantially flat first end 16 and a second section or secondary surface 17 of smaller diameter than that of the primary cylindrical surface. This secondary surface of smaller diameter is disposed axially of the piston body between the primary cylindrical surface 15 and the first end of the piston body. The secondary surface has the shape of a truncated cone tapering very slightly inwardly from the primary cylindrical surface in the direction of the first end of the piston body. The degree of taper is exaggerated in FIG. 3 for illustrative convenience.

The primary cylindrical surface 15 is, more specifically, composed of a pair of spaced annular guide portions or shoulders 18 defining the diameter conforming to the interior diameter of the cylinder wall as above described, and separated from each other by an annular recess 19. Each of the annular shoulders 18 has rounded marginal edges 20. The upper rounded marginal edge of the upper shoulder 18, as shown in FIG. 3, is of a smaller radius of curvature than the other rounded marginal edges so that a shelf or seat is formed at the juncture of the upper annular shoulder 18 and the secondary surface 17 and so that a bead of lubricating oil is carried therein during operation of the piston.

Figure 3:
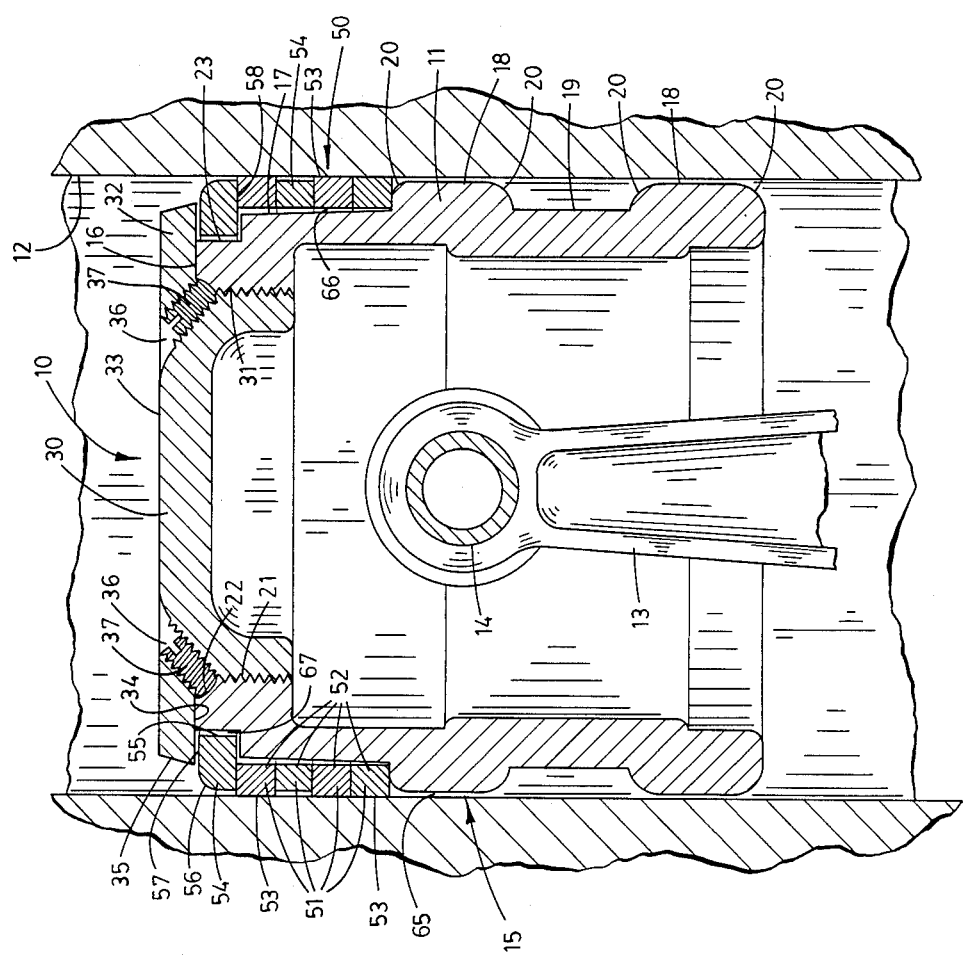
FIG. 3 is a somewhat enlarged, fragmentary transverse section taken from a position indicated by line 3—3 in FIG. 2 and showing the clearances between the piston body and the cylinder wall and between the ring assembly and the piston body in somewhat exaggerated size for illustrative convenience.

The first end 16 of the piston body 11 has an internally screw threaded bore 21 extending axially therethrough and into the interior of the piston body, as shown in FIG. 3. The bore 21 at the first end 16 of the piston body is circumscribed by an annular beveled shoulder 22. The piston body has a third section or annular recess 23 of smaller diameter than the smallest diameter portion of the tapered secondary surface 17 and immediately adjoining the first end 16. The diameter of the annular recess 23 to that of the secondary surface 17 is in the relationship shown in FIG. 3.

Figure 2:
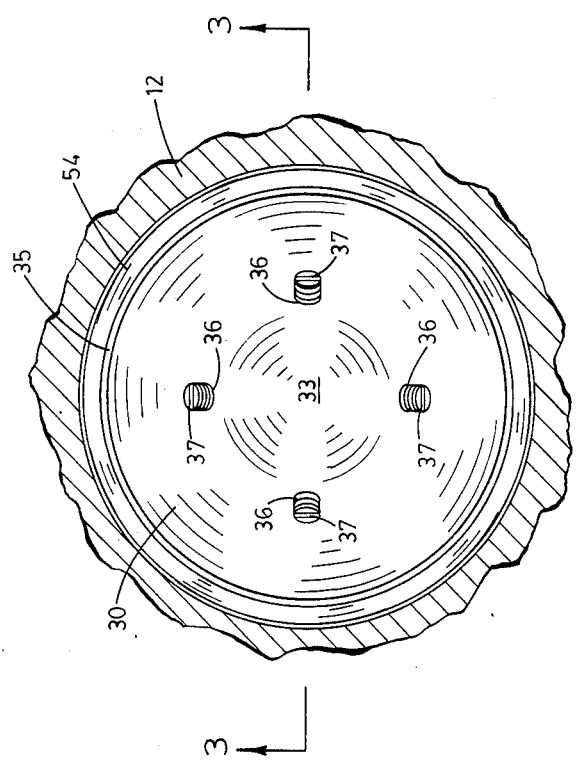
FIG. 2 is a top plan view of the piston shown in a typical operative environment received in a cylinder which is shown fragmentarily and in section along a plane normal to the longitudinal axis of the cylinder.

A cap 30 is releasably mounted on the first end 16 of the piston body 11 in covering relation thereto as can best be seen in FIG. 3. The cap has an externally screw threaded portion 31 adapted to be screw threadably received in the screw threaded bore 21. The cap has a plate portion 32 having a substantially flat upper surface 33 and opposite, substantially flat lower surface 34 circumscribing the screw threaded portion 31. The plate portion of the cap has a beveled shoulder 35 extending thereabout and, when the cap is installed as shown in FIG. 3, tapering in the direction away from the piston body. The cap is so tapered to avoid contact with the upper portion of the cylinder and to facilitate agitation of exploding gases within the combustion chamber. Four internally screw threaded bores 36 extend through the plate portion of the cap interconnecting the upper and lower surfaces 33 and 34 respectively thereof. The bores 36 are disposed at angles so that when the cap is in the installed position shown in FIG. 3, the longitudinal axis of each bore is substantially right-angularly related to the annular beveled shoulder 22 of the piston body 11. The bores are arranged in spaced relation to each other as shown in FIG. 2. Each bore is adapted screw threadably to receive an Allen screw 37 which is screw threaded a short distance into suitable screw threaded bores in the beveled shoulder 22 releasably to lock the cap into the installed position shown in FIG. 3.

The upper surface 33, in the installed position of the cap 30, is disposed for exposure to fluid within the cylinder wall 12. It should be understood that the word fluid is used herein as indicating either a liquid or a gas. Thus, the piston 10 herein described can be utilized in a variety of different environments including internal combustion engines, pumps of various natures, hydraulic cylinders, and the like.

As shown best in FIGS. 1 and 3, a piston ring assembly 50 is mounted in an operational position substantially concentrically of and about the secondary surface 17 of the piston body 11. The piston ring assembly is installed in the position described and shown by loosening the Allen screws 37 and screw threadably removing the cap 30 from the screw threaded bore 21. The piston ring assembly is then slipped about the first end 16 of the piston body and into position about the second surface 17 of the piston body.

The piston ring assembly is composed of, in this instance, five individual piston rings 51 stacked on top of each other. Each of the piston rings has an inwardly disposed surface 52 and an outwardly disposed surface 53 relative to the piston body. Depending upon the length of the secondary surface 17 of the piston body and on the thickness of the rings employed, a greater or lesser number of rings can be employed. It is preferred, however, that a sufficient number of rings be employed so that the upper surface of the uppermost ring, as shown in FIG. 3, reaches to a point in juxtaposition to the annular recess 23.

The piston rings 51 include two spacer rings 54. The first is received in the annular recess 23 and has an inwardly disposed surface 55 and a beveled outwardly disposed surface 56. The spacer ring has an upper surface 57 and an opposite lower surface 58, as shown in FIG. 3. The lower surface 58 engages the upper surface of the uppermost piston ring as shown in FIG. 3. The second spacer ring, as shown in FIG. 3, is disposed below the next piston ring in the piston ring assembly. The outer diameters of the spacer rings are spaced from the cylinder wall 12 approximately the same distance as the annular shoulders 18 from the cylinder wall. The spaces allow oil to be carried along the cylinder wall. The cap 30 is reinstalled on the first end 16 of the piston body in the manner already described to capture the spacer ring and the remainder of the piston ring assembly in the positions described. It will be understood that with the exception of the spacer rings all of the piston rings are slotted in the conventional manner and tensioned outwardly against the cylinder wall. The spacer rings are not slotted but are recessed from the cylinder wall.

When assembled as shown and described and the piston 10 is installed in the cylinder wall 12 as shown in FIG. 3, a clearance or space 65, already described as existing in conventional engines, is provided between the primary cylindrical surface 15 of the piston body and the cylinder wall concentric to and about the piston body. Similarly, a clearance or space 66 is provided between the inwardly disposed surfaces 52 of the piston rings and the secondary surface 17 of the piston body. As can be seen in FIG. 3, the space 66 widens in the direction of the first end 16 of the piston body. A clearance or space 67 is provided between the inwardly disposed surface 55 of the spacer ring 54 and the piston body within the annular recess 23. As previously noted, the depths of the spaces 65, 66 and 67 shown in FIG. 3 are exaggerated for illustrative convenience. However, the depth of space 67 is greater than the depth of space 65.

As the piston 10 travels in its path through the cylinder body 12, in reciprocal movement, the space 65 created therebetween and the space 67 between the inwardly disposed surface 56 of the upper spacer ring 54 and the piston body within the annular recess 23 cooperate to transfer lateral thrust pressure, encountered in the area of the spacer ring, substantially equally and simultaneously over the area of piston ring assembly and the primary cylindrical surface 15 of the piston body 11. The primary cylindrical surface, is generally speaking, a better lubricated portion of the piston in view of its closer proximity to the oil within the crankcase of the engine.

As noted, the spaces 65, 66 and 67 are exaggerated in size as shown in FIG. 3 for illustrative convenience. In the subject invention, the actual depths or widths of the spaces 65, 66 and 67 would be smaller. However, the spaces 65, 66 and 67 in FIG. 3 are illustrative of their relationships to each other in the piston shown. Sound engineering practice may require, depending upon the actual circumstances, that the actual measurements and relationships be somewhat different in order to afford the operative benefits already described. Thus, for example, the distance between the pin 14 and the upper spacer ring 54 in a particular piston will control the depth of recess required of space 66 to achieve the substantially equal and simultaneous transfer of the lateral thrust pressure over the area of the piston ring assembly and the primary cylindrical surface.

The transfer of lateral thrust pressure is effected by movement of the piston body 11 into, and out of, the spaces 66 and 67. As the thrust pressure is created during passage of the piston through top and bottom center of the cylinder wall 12, the piston body is caused to deviate somewhat from its substantially axial path. Heretofore, in conventionally designed pistons, the deviant motion of the piston body has caused the piston rings to be moved from an attitude whereby they were in substantially facing engagement with the cylinder wall, to positions wherein edges of the piston rings were moved to contact with the surface of the cylinder wall 12. This action has caused the scoring of the cylinder walls. In the present invention, any such deviant motion of the piston body caused by such lateral thrust pressure does not move the piston rings from their attitude of facing engagement with the cylinder wall since the piston body can move into the spaces 66 and 67. Thus scoring of the cylinder wall does not take place. Furthermore the movement of the piston body into and out of the spaces 66 and 67 causes any lateral thrust pressure which is not absorbed in the foregoing manner and which conventionally comes to bear most strongly in the area of piston most closely adjacent to the combustion surface end, in the piston of the present invention to be transferred over the area of the piston ring assembly and the primary cylindrical surface 15.

OPERATION

The operation of the described embodiment of the present invention is believed readily apparent and is briefly summarized at this point.

The employment of the piston 10, for operation in a cylinder, is best understood by reference to FIG. 3. As the piston moves in a substantially axial path in reciprocal movement within the cylinder wall 12, the piston must travel through top and bottom center of the cylinder or cylinder wall. As the piston passes top and bottom center, the lateral thrust pressure, previously discussed, develops which causes the piston body 11 to deviate somewhat from its substantially axial path. In conventional pistons, this deviant movement has caused piston rings that were deployed on the conventional piston to be moved from their intended attitudes wherein the piston rings were in substantially facing engagement with the cylinder wall, to positions in which edges of the piston rings were deployed in contact with the surface of the cylinder wall. The subsequent exposure of the edges of the piston rings causes scoring of the cylinder wall which, if allowed to continue, would result in significant damage to the engine.

In addition, a vibration is set up which is transferred to the crankshaft in conventional piston construction.

The present invention overcomes the aforementioned problem caused by lateral thrust pressure by presenting a novel structure wherein the piston rings 51 and spacer rings 54 enclose spaces 66 and 67 which absorb in large part the lateral thrust pressure and transfer that lateral thrust pressure not absorbed to the primary cylindrical surface 15 of the piston body. The lateral thrust pressure which is transferred to the primary cylindrical surface is placed on a portion of the piston body which is generally a better lubricated area. The transfer of the lateral thrust pressure takes place because the piston body is permitted to move into, and out of, the spaces 66 and 67. Such movement of the piston body has no detrimental effect on the associated piston rings which are captured about the piston body. Thus, the piston rings are permitted to remain in facing engagement with the cylinder wall 12 and therefore do not damage the cylinder wall nor do the edges of the rings wear prematurely.

Similarly, the movement of the piston body 11 within the spaces 66 and 67 has no effect on the seal which is created between the respective piston rings 51 and spacer ring 54, and the cylinder wall 12. Therefore, the piston of the subject invention permits the piston rings and spacer rings to maintain an effective seal against the cylinder wall despite deviant movement of the piston.

As previously discussed, the replacement of worn or damaged piston rings on a piston of conventional construction, involves a rather complex and time-consuming process requiring removal of the piston and rod assembly from the engine to gain access to the area of the piston body where the defective piston rings are mounted. The piston 10 of the present invention, however, has a cap 30 which is releasably affixed on the first end 16 of the piston body. The cap captures the piston rings 51 and the spacer ring 54 in their respective operational positions. Consequently, the piston ring and spacer ring can be removed from the piston body by removal of the cap without necessitating removal of the piston or rod assembly from the cylinder. Therefore, the repair and replacement of these rings is rendered substantially easier and much less expensive. Similarly, since the piston is not removed from the cylinder, the risk of damage to the cylinder wall, rings or the piston body conventionally associated with the removal and reinstallation of conventional pistons is avoided.

As can best be visualized in FIG. 3, the annular space defined by the uppermost rounded marginal edge 20 of the uppermost annular shoulder 18 of the primary cylindrical surface 15 and by the lower surface of the lowermost piston ring 51 together with the cylinder wall 12 operates as an oil reservoir to transport an annular bead of oil along the cylinder wall for improved lubrication. The annular recess 19 serves the same function. The Allen screws 37, when the cap is in the installed position, operate to insure that the cap does not come loose during operation of the engine.

Therefore, the piston of the present invention is operable in such a manner as to preclude the scoring and other damage to its cylinder wall and piston rings which has been associated in conventional piston construction with the development of lateral thrust pressure and furthermore can be serviced and maintained without requiring removal of the piston and rod assembly from the cylinder.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A piston for operation within a cylinder and wherein the cylinder has an internal cylinder wall the piston comprising:

a piston body having a primary cylindrical surface with a diameter substantially conforming to the interior diameter of said cylinder, the primary cylindrical surface composed of a pair of annular portions having diameters substantially conforming to the interior diameter of the cylinder with an annular recess interposed between the annular portions of said pair of annular portions, said piston body further having a first end and a secondary surface of smaller diameter than said diameter of the primary cylindrical surface disposed axially of the piston body betweeen the primary cylindrical surface and the first end;

a cap having a surface adapted for exposure to a fluid within the cylinder;

at least one piston ring disposed in an operational position substantially concentrically of and about said secondary surface of the piston body, and an annular space extends about the piston between the piston ring and the primary cylindrical surface operable to receive oil in operation and to carry said oil along the cylinder wall to enhance lubrication; and means releasably mounting the cap on the first end of the piston body capturing the piston ring in said operational position.

2. A piston for operation within a cylinder, the piston comprising:

a piston body having a primary cylindrical surface with a diameter substantially conforming to the interior diameter of said cylinder, a first end and a secondary surface of smaller diameter than said diameter of the primary cylindrical surface disposed axially of the piston body between the primary cylindrical surface and the first end, the secondary surface of the piston body tapering in converging relation from the primary cylindrical surface toward the first end of the piston body forming a frustum of a cone;

a cap having a surface adapted for exposure to a fluid within the cylinder;

a plurality of piston rings having interior surfaces of substantially the same diameter are captured in stacked relation between said cap and the primary cylindrical surface and about the secondary surface forming the frustum of a cone; and means releasably mounting the cap a on the first end of the piston body capturing the plurality of piston rings in said stacked relation.

3. The piston of claim 2 in which the cylinder has an interior cylinder wall and wherein the secondary surface has a recessed surface forming an annular recess between said frustum of a cone and the first end of smaller diameter than the frustum of a cone and a spacer ring is received in the recess captured in position by said cap and engaging said plurality of piston rings, said spacer ring having an inner surface of larger diameter than that of the recessed surface permitting lateral thrust pressure developed during movement of the piston body within the cylinder to be absorbed by lateral movement of the spacer ring within the recess and the piston rings as accommodated by the frustum of a cone upon impinging contact thereof with the cylinder wall.

4. The piston of claim 3 wherein said larger diameter of the inner surface of the spacer ring relative to the recess surface provides a space greater than the space between the primary cylindrical surface and the cylinder wall, said spaces transferring lateral thrust pressure developed during movement of the piston within the cylinder substantially equally over the piston rings and the primary cylindrical surface of the piston body.

5. A piston for operation within a cylinder, the piston comprising:
- a piston body having a primary cylindrical surface with a diameter substantially conforming to the interior diameter of said cylinder, a first end, which has formed therein an internally screw-threaded bore, and a secondary surface of smaller diameter than said diameter of the primary cylindrical surface disposed axially of the piston body between the primary cylindrical surface and the first end;
- a cap having a surface adapted for exposure to a fluid within the cylinder, the cap having an externally screw-threaded portion adapted to be screw-threadably secured in the bore of the piston body, and Allen screws screw-threadably extended at oblique angles through said cap and into abutment with the piston body releasably to lock the cap in mounted position on the piston body; and
- at least one piston ring disposed in an operational position substantially concentrically of and about said secondary surface of the piston body.

6. A piston operable within a cylinder, having an internal cylindrical surface, of an internal combustion engine, the piston comprising:
- a piston body having a pair of annular guide portions extending thereabout defining an outer periphery for a first section of the piston body substantially conforming to the internal cylindrical surface of the cylinder, a second section recessed from said outer periphery and tapering therefrom in converging relation to form a frustum of a cone, a third section recessed from the second section to form an annular recess and a screw threaded bore substantially concentric to a longitudinal axis of the piston body;
- a plurality of piston rings having outer peripheries dimensioned for engagement with the internal cylindrical surface of the cylinder and inner peripheries having diameters larger than the diameter of the second section;
- a spacer ring received in the annular recess of the third section of the piston body and having an internal diameter larger than the external diameter of the third section; and
- a piston cap having an externally screw threaded portion screw-threadably received in the screw threaded bore of the piston body to mount the piston cap in covering relation to the piston body and having a periphery overlapping the annular recess of the third section of the piston body to capture the spacer ring in said annular recess and the piston rings about said second section for limited lateral movement of said spacer ring and piston rings relative to the piston body to accommodate lateral thrust pressures of the piston body during movement of the piston body within said cylinder to minimize scoring of said internal cylindrical surface of the cylinder during operation of the internal combustion engine.

7. The piston of claim 6 wherein the periphery of the piston cap is tapered in converging relation in a direction extending away from the spacer ring.

8. The piston of claim 6 wherein the annular guide portions of the first section of the piston body each have rounded shoulders to reduce friction, improve lubrication and enhance heat dissipation.

* * * * *